(12) United States Patent
Mula et al.

(10) Patent No.: US 10,057,017 B2
(45) Date of Patent: *Aug. 21, 2018

(54) DATA FORWARDING WITH SPECULATIVE ERROR CORRECTION

(71) Applicant: Mellanox Technologies TLV Ltd., Raanana (IL)

(72) Inventors: Liron Mula, Ramat Gan (IL); Ran Ravid, Tel Aviv (IL); Oded Wertheim, Tel Aviv (IL); Ran Sela, Givat Shmuel (IL); Roy Kriss, Netanya (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,928

(22) Filed: Mar. 28, 2017

(65) Prior Publication Data

US 2017/0201350 A1    Jul. 13, 2017

Related U.S. Application Data

(63) Continuation-in-part of application No. 14/870,031, filed on Sep. 30, 2015, now Pat. No. 9,673,934.

(51) Int. Cl.
*H03M 13/00* (2006.01)
*H04L 1/16* (2006.01)
*H04L 29/08* (2006.01)

(52) U.S. Cl.
CPC ............. *H04L 1/16* (2013.01); *H04L 69/324* (2013.01)

(58) Field of Classification Search
CPC ... H04L 1/0041; H04L 1/0045; H04L 69/323; H04L 69/324
See application file for complete search history.

(56) References Cited

U.S. PATENT DOCUMENTS

2007/0183196 A1* 8/2007 Gendrier ............. G06F 11/1008
365/185.03
2013/0326308 A1* 12/2013 Angelopoulos ..... H03M 13/373
714/758

* cited by examiner

*Primary Examiner* — Sam Rizk
(74) *Attorney, Agent, or Firm* — D. Kligler IP Services Ltd.

(57) ABSTRACT

Communication apparatus includes an input circuit, which receives a sequence of symbols arranged in a series of data blocks, including data symbols that encode the data and forward error correction (FEC) symbols that encode an error correction code. The input circuit decodes the data encoded by the data symbols and passes the decoded data to a buffer for output to a data link layer interface irrespective of the FEC symbols. An error correction circuit receives the data and the error correction code from the input circuit, and upon detecting an error in a given data block in the series, passes the corrected data from the given data block to the buffer for output to the data link layer interface in place of the data from the given data block that the input circuit decoded and passed to the buffer.

10 Claims, 2 Drawing Sheets

DATA FORWARDING WITH SPECULATIVE ERROR CORRECTION

CROSS-REFERENCE TO RELATED APPLICATION

This application is a continuation in part of U.S. patent application Ser. No. 14/870,031, filed Sep. 30, 2015, whose disclosure is incorporated herein by reference.

FIELD OF THE INVENTION

The present invention relates generally to data communications, and particularly to methods and apparatus for correction of data errors in packet network communications.

BACKGROUND

Packet data networks are generally built on a multi-layer communication model, such as the Open Systems Interconnection (OSI) model. The lowest layer in the model, referred to as Layer 1, is the physical layer (PHY), in which a transmitter transmits a raw bit stream over a physical medium to a receiver. The next layer (Layer 2) is the data link layer, which provides a protocol for reliable transmission of data frames, also referred to as packets, between two nodes connected by a physical layer. Common data link layer protocols include Ethernet and InfiniBand Layer 2.

In many networks, error detection and/or error correction capabilities are built into the Layer 1 protocol. For example, the Layer 1 protocol may provide for forward error correction (FEC), in which redundant bits are added to the data stream by the transmitter and can then be used by the receiver in detecting and correcting bit errors. Many FEC schemes use block codes, such as Reed-Solomon, BCH, parity, or Hamming codes.

In some applications, issues of latency may be taken into account in designing error correction logic. For example, U.S. Patent Application Publication 2017/0012738 describes techniques for minimizing latency and/or power consumption for communications on a link. Upon determining that a cyclic redundancy check (CRC) for a portion of a received stream of bits is valid, the portion of the stream of bits is forwarded without performing forward error correction (FEC) decoding for the first portion. Upon determining that a CRC for the portion of the stream of bits is invalid, FEC decoding is performed for the portion before forwarding the portion of the stream of bits.

SUMMARY

Embodiments of the present invention that are described hereinbelow provide methods and apparatus for efficient error correction in a data receiver.

There is therefore provided, in accordance with an embodiment of the invention, communication apparatus, including a buffer, which is configured to hold data for output to a data link layer interface. An input circuit is configured to receive over a communication link a sequence of symbols arranged in a series of data blocks. The symbols in each data block include a first set of data symbols that encode the data, and a second set of forward error correction (FEC) symbols that encode an error correction code computed over the data encoded in the data block. The input circuit decodes the data encoded by the data symbols and passes the decoded data to the buffer irrespective of the FEC symbols. An error correction circuit is coupled to receive the data and the error correction code from the input circuit, to detect and correct errors in the data using the error correction code so as to generate corrected data, and upon detecting an error in a given data block in the series, to pass the corrected data from the given data block to the buffer for output to the data link layer interface in place of the data from the given data block that the input circuit decoded and passed to the buffer.

In some embodiments, the error correction circuit is configured to check each of the data blocks for the errors and to output a signal to the data link layer interface indicating whether each of the data blocks was error-free or erroneous. Typically, the error correction circuit is configured to compute a corrected data block within a predefined computation time, and to check for the errors and output the signal with respect to any particular data block in the series within a detection time that is less than half the predefined computation time. Additionally or alternatively, the error correction circuit is configured to check for the errors and output the signal with respect to any particular data block within a detection time that is no greater than a write time required for the data in the particular data block to be decoded by the input circuit and transferred to the buffer.

In a disclosed embodiment, the apparatus includes a multiplexer, which has an output coupled to the buffer, a first input coupled to receive the data from the input circuit, and a second input coupled to receive the corrected data from the error correction circuit, and is configured to select the first input as long as the data blocks are error-free and, upon detection of an erroneous data block by the error correction circuit, to select the second input so that the corrected data is output from the multiplexer to the buffer. In one embodiment, selecting the second input causes the corrected data to overwrite the data previously decoded from the given data block and passed by the input circuit to the buffer.

There is also provided, in accordance with an embodiment of the invention, a method for communication, which includes receiving over a communication link a sequence of symbols arranged in a series of data blocks. The symbols in each data block include a first set of data symbols that encode the data, and a second set of forward error correction (FEC) symbols that encode an error correction code computed over the data encoded in the data block. The data encoded by the data symbols are encoded and passed, irrespective of the FEC symbols, to a buffer for output to a data link layer interface. Concurrently with passing the decoded data to the buffer, errors in the data are detected using the error correction code. The errors are corrected using the error correction code so as to generate corrected data. Upon detecting an error in a given data block in the series, the corrected data are passed from the given data block to the buffer for output to the data link layer interface in place of the data from the given data block that were previously decoded and passed to the buffer.

The present invention will be more fully understood from the following detailed description of the embodiments thereof, taken together with the drawings in which:

DETAILED DESCRIPTION OF EMBODIMENTS

Figure 1:
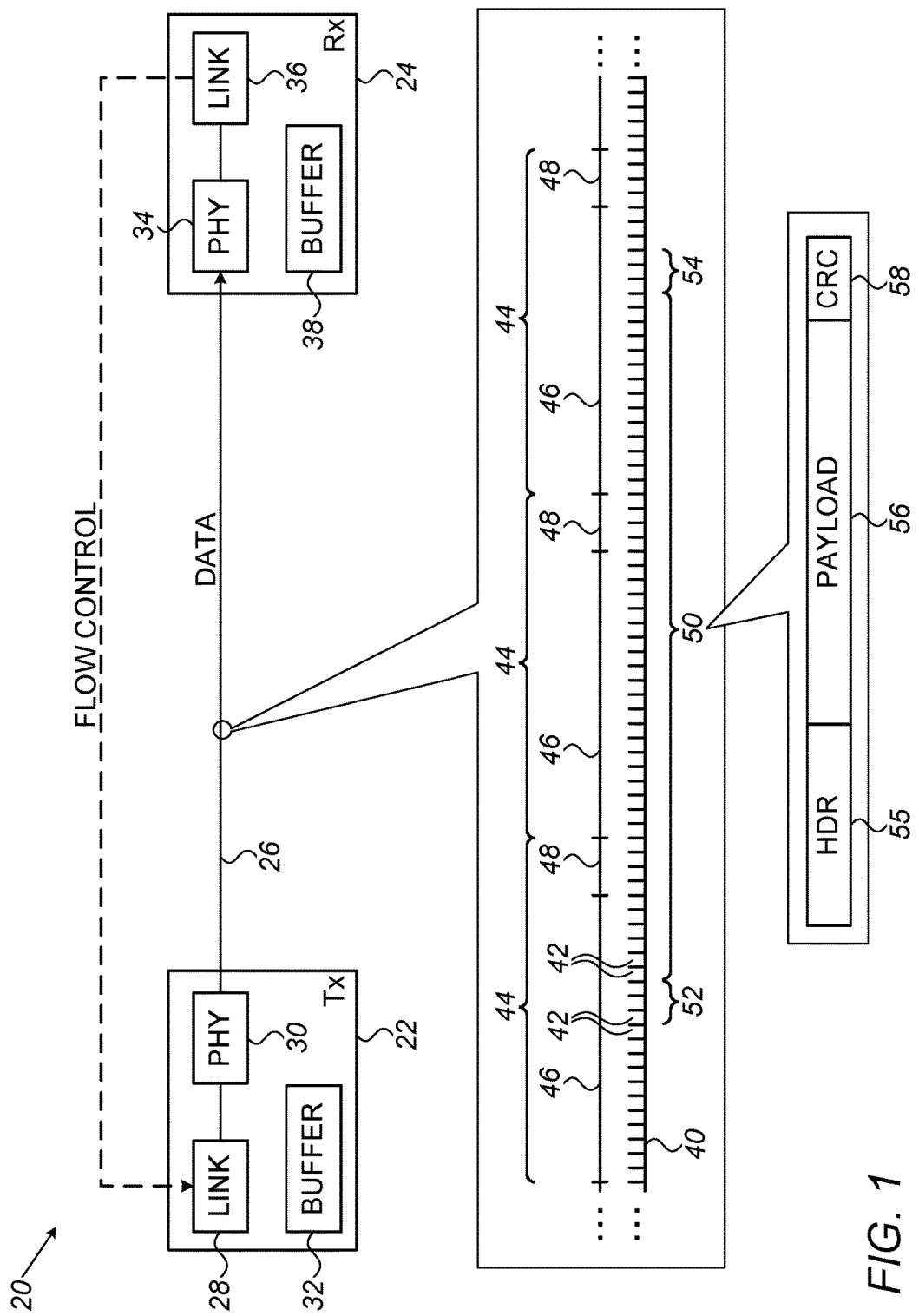
FIG. 1 is block diagram that schematically illustrates a data communication network, in accordance with an embodiment of the invention.

Physical-layer FEC can be critical in maintaining reliable communications over noisy links, in which bit errors are common. This added reliability comes, however, at the cost of added latency in the receiver, since error correction in any given FEC block can start only after the entire block, including redundant bits, has reached the receiver. In other words, the PHY interface of the receiver is able to pass the data in a given block to the data link layer for packet processing only after a delay equal to at least the block size (in bits) divided by the bit rate of the link.

In many networks, however, the bit-error rate is very low, and only a small fraction of the FEC blocks will actually contain errors. On data links with low bit-error rates, the penalty of added latency that is incurred by physical-layer error correction in the receiver may outweigh its benefit.

Embodiments of the present invention that are described herein address this problem by applying physical-layer error correction in the receiver speculatively. Specifically, the error correction circuit in the PHY interface of the receiver will normally operate only as a retrospective error detection mechanism. The PHY interface will therefore decode and pass data immediately, as received from the communication link, to a buffer from which the data link layer interface reads the incoming data packets. These decoding and data transfer operations are carried out irrespective of the FEC symbols and thus with no added latency due to the error correction circuit.

The error correction circuit receives the data symbols and FEC symbols and performs its error detection function concurrently with the normal decoding and writing of the decoded data to the buffer. Typically, the error correction circuit outputs a signal to the data link layer interface indicating, for each data block, whether the original decoded data are error-free, and can thus be read out immediately from the buffer, or whether an error was detected, in which case the data link layer interface should wait for the data to be replaced with corrected data. When an error is detected in a given data block, the error correction circuit generates corrected data using the corresponding FEC symbols, and passes the corrected data to the buffer for output to the data link layer interface in place of the erroneous data.

Thus, the error correction circuit in the PHY interface normally operates only as an error detector, in parallel with the data path of the PHY interface, and intervenes in the data path only when an error is actually detected. Once error-free reception has been restored after processing the data block in which the error was detected, the error correction circuit returns to its previous error detection role. As a result, the PHY interface can usually operate with latency of no more than one or a few symbols, rather than an entire block. Although the latency increases abruptly when errors are detected, buffering in the PHY interface and/or flow control in the data link layer can enable the receiver to absorb and compensate for these changes without data loss until error-free performance is restored.

System Description

FIG. 1 is block diagram that schematically illustrates a data communication network 20, in accordance with an embodiment of the invention. In this simplified example, network 20 comprises a single transmitter 22 and a single receiver 24, connected by a physical link 26 (although embodiments of the present invention will typically be applied in more complex networks, having many nodes that both transmit and receive). Transmitter 22 and receiver 24 may, for example, be deployed as ports of switches in network 20 or of a network interface controller that connects a host computer to the network.

Transmitter 22 comprises a data link layer interface 28, which assembles data packets for transmission over link 26, in accordance with the applicable data link layer protocol. A PHY interface 30 encodes the data in the packets as a sequence of data symbols in a series of data blocks and computes and adds FEC symbols to each data block, in accordance with the applicable physical layer protocol on link 26. An output buffer 32 comprises memory, which stores packet data temporarily until the transmitted packets have been acknowledged by receiver 24 and thus enables transmitter 22 to accommodate flow control instructions from the receiver without substantial data loss. Although flow control can be used in conjunction with some embodiments of the present invention, however, it is not an essential feature and can be implemented with or without the use of an output buffer in transmitter 22.

Figure 2:
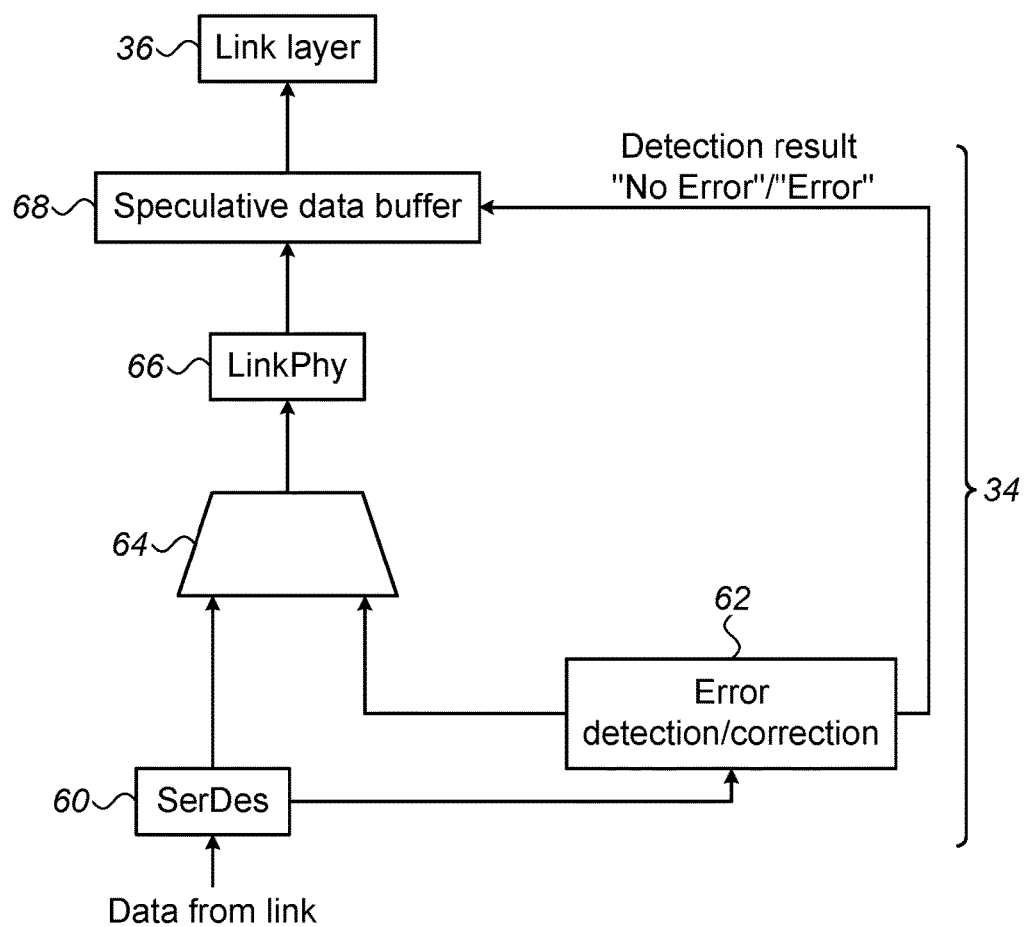
FIG. 2 is a block diagram that schematically shows details of a packet data receiver, in accordance with an embodiment of the invention.

Receiver 24 likewise comprises a PHY interface 34, which receives and decodes the symbols transmitted by PHY interface 30. PHY interface 34 includes an error correction circuit, as shown in FIG. 2, which operates as described below. An input buffer 38 comprises a memory, which buffers the data blocks received by PHY interface 34. A data link layer interface 36 receives decoded data packets from PHY interface 34 and performs appropriate link layer processing functions, as are known in the art. Data link layer interface 36 also sends flow control instructions, such as flow credits or pause frames, to its peer data link layer interface 28 in transmitter 22, in order to regulate the rate of transmission by transmitter 22 and thus avoid congestion and possible buffer overflow at receiver 24.

The inset in FIG. 1 shows a sequence 40 of physical layer symbols 42 that are transmitted over link 26. Each symbol 42 encodes one or more bits of data, depending on the encoding scheme in use on link 26. Symbols 42 are arranged in a series of data blocks 44. The symbols in each data block 44 comprise a set of data symbols 46, which encode the transmitted data, and a set of FEC symbols 48, computed over the data encoded in data block 44. Blocks have a predefined block size, which is typically constant from block to block.

Data symbols 46 encode data comprising Layer 2 data packets 50. Data packets 50 have respective packet sizes that are typically different from the block size and can vary from packet to packet. Thus, the packet boundaries of data packets 50 generally do not coincide with the block boundaries of data blocks 44. In the example shown in FIG. 1, packet 50 is relatively large and extends over several data blocks 44. Alternatively, small packets may be contained entirely inside a single data block 44. Packet 50 is typically set off within sequence 40 by one or more start-of-frame (SOF) symbols 52 and end-of-frame (EOF) symbols 54, which enable the receiving PHY interface 34 to identify and pass packets 50 to data link layer interface 36. Packet 50 may be preceded and succeeded in sequence 40 by other packets or by fill (dummy) symbols.

Each packet 50 comprises a header 55, a data payload 56 and an error detection code 58, such as a CRC computed over the header and payload, as provided by applicable standards. Data symbols 46 encode the data bits in these different parts of packet 50 indiscriminately, i.e., without distinguishing between header, payload, and CRC.

FIG. 2 is a block diagram that schematically shows details of receiver 24, in accordance with an embodiment of the invention. This figure and the description that follows present an example implementation of the techniques of speculative error correction that are described above, including elements of PHY interface 34 and data link layer interface 36 as marked in the figure and a speculative data buffer 68 in FIG. 2 corresponding to at least a portion of buffer 38 in FIG. 1.

FIG. 2 shows functional components of receiver 24, which are typically implemented in dedicated or programmable hardware logic circuits in one or more integrated circuits, such as an application-specific integrated circuit (ASIC). Alternatively, at least some of the functions of receiver 24 may be performed by a programmable processor under the control of firmware or other software. FIG. 2 shows only the components of receiver 24 that are necessary for an understanding of the error-handling functionality that is described herein. Integration of this functionality into a full-fledged network element, such as a switch or NIC, will be apparent to those skilled in the art after reading the present description.

PHY interface 34 comprises an input circuit 60, which includes serializing/deserializing functionality and is thus referred to as a "SerDes." Input circuit 60 receives symbols 42 over link 26, decodes the data encoded by data symbols 46, and passes the resulting decoded data via a multiplexer 64 and framing logic 66 to buffer 68. Input circuit 60 passes the decoded data to the buffer immediately, irrespective of FEC symbols 48, i.e., without waiting to ascertain that the data are error free. For this reason, the input circuit is said to forward the data while applying error correction "speculatively," i.e., on the assumption that the data are error-free. Framing logic detects the start and end of each packet (typically based on SOF and EOF symbols 52 and 54) and organizes the packet data in buffer 68 for processing by link layer interface 36. (For this reason, the framing logic is said to perform "LinkPhy" functions.)

Concurrently with speculative forwarding of the data to buffer 68, input circuit 60 passes the decoded data and the corresponding error correction code, as encoded by FEC symbols 48, to an error detection and correction circuit 62. Circuit 62 comprises computational logic, which computes the syndrome of the data in each of data blocks 44 and compares it to the corresponding error correction code in order to detect errors in the data. On this basis, circuit 62 outputs a signal indicating whether each of the data blocks was error-free or erroneous, thus indicating to data link layer interface 36 whether to read the data or wait for correction. Assuming link 26 to have a low bit-error rate, transmitter 22 and receiver 24 may use a "lightweight" error correction coding scheme, which enables circuit 62 to perform the syndrome computation and detect errors quickly. By appropriate choice of the coding scheme and design of circuit 62, the error/no-error signal for each data block 44 can be generated within a detection time that is no greater than the write time required for the data in the particular data block to be decoded and transferred (speculatively) from input circuit 60 to buffer 68. Thus, no additional latency is incurred by the error detection function.

For example, for a link operating at 100 Gb/s (such as an Ethernet link operating in accordance with the IEEE 802.3bj specification), each of data blocks 44 comprises 5280 bits, with a Reed-Solomon (528,514) FEC code. Thus, in the absence of the speculative mechanism provided by the present embodiment, PHY interface 34 would need to wait 52.8 ns (assuming full wire speed) to receive and store each block before beginning the error detection/correction computation. Only after completion of this stage does framing logic 66 begin operating on the block, so that the total latency, before the data can be delivered to data link layer interface 36 for packet processing, is the sum of the times required for error correction and framing operations. By contrast, in the present embodiment, framing logic 66 begins operating on block 44 immediately, in parallel with error detection by circuit 62. Thus, in this case, as long as no errors are detected, the latency is determined by the longer of the framing time and the error detection time, rather than their sum, and is thus typically reduced by tens of nanoseconds in compared with conventional PHY interface implementations.

In addition, circuit 62 comprises error correction logic, which uses the error correction codes to correct bit errors when they occur. As long as no errors are detected, the error correction function of circuit 62 is dormant, meaning that the output of the error correction logic is computed but then discarded, or possibly that the error correction logic does not operate at all. In its default state, when no errors are detected, multiplexer 64 selects the decoded data from input circuit 60 to pass to framing logic 66, and thence to buffer 68. When circuit 62 detects an error in a given data block 44, however, the error correction logic passes the corrected data via multiplexer 64 and framing logic 66 to buffer 68, for output to data link layer interface 36, in place of the erroneous decoded data from the given data block that were speculatively passed to the buffer beforehand. Buffer 68 can be configured so that the corrected data from a given block overwrites the erroneous data that input circuit 60 previously decoded and passed to the buffer. When the signal from circuit 62 indicates that the data in the buffer have been corrected, data link layer interface 36 will read the data and proceed with packet processing.

In this latter case, additional latency is necessarily incurred in the data path through PHY interface 34. For example, the computation time that is required to correct a data error in a given block may be twice the detection time that is needed simply to detect the errors, and possibly longer still. Thus, packet processing by receiver 24 will be temporarily delayed. By operating the PHY and data link layer interfaces at an internal clock speed that is faster than the transmission speed on link 26, and applying flow control as needed to transmitter 22, however, receiver 24 is able to "catch up" with the transmitted data and return to low-latency operation after the detected error has been corrected.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
    a data link layer interface, which is configured to perform link-layer processing functions on data packets received over a communication link;
    a buffer, which is configured to hold data for output to the data link layer interface; and
    a physical layer (PHY) interface, comprising:
        an input circuit, which is configured to receive over the communication link a sequence of symbols arranged in a series of data blocks, which encode the data packets, the symbols in each data block comprising a first set of data symbols that encode the data, and a second set of forward error correction (FEC) symbols that encode an error correction code computed over the data encoded in the data block, and to decode the data encoded by the data symbols and pass the decoded data to the buffer irrespective of the FEC symbols; and an error correction circuit, which is coupled to receive the data and the error correction code from the input circuit, to detect and correct errors in the data using the error correction code so as to generate corrected data, and upon detecting an error in a given data block in the series, to pass the corrected data from the given data block to the buffer for output to the data link layer interface in place of the data from the given data block that the input circuit decoded and passed to the buffer, wherein the error correction circuit is configured to check each of the data blocks for the errors and to output a signal to the data link layer interface indicating whether each of the data blocks was error-free or erroneous, and the data link layer interface is configured to read the data from the buffer or wait for correction depending upon the signal.

2. The apparatus according to claim 1, wherein the error correction circuit is configured to compute a corrected data block within a predefined computation time, and to check for the errors and output the signal with respect to any particular data block in the series within a detection time that is less than half the predefined computation time.

3. The apparatus according to claim 1, wherein the error correction circuit is configured to check for the errors and output the signal with respect to any particular data block within a detection time that is no greater than a write time required for the data in the particular data block to be decoded by the input circuit and transferred to the buffer.

4. The apparatus according to claim 1, and comprising a multiplexer, which has an output coupled to the buffer, a first input coupled to receive the data from the input circuit, and a second input coupled to receive the corrected data from the error correction circuit, and is configured to select the first input as long as the data blocks are error-free and, upon detection of an erroneous data block by the error correction circuit, to select the second input so that the corrected data is output from the multiplexer to the buffer.

5. The apparatus according to claim 4, wherein selecting the second input causes the corrected data to overwrite the data previously decoded from the given data block and passed by the input circuit to the buffer.

6. A method for communication, comprising:

receiving in a physical layer (PHY) interface over a communication link a sequence of symbols arranged in a series of data blocks, the symbols in each data block comprising a first set of data symbols that encode the data, and a second set of forward error correction (FEC) symbols that encode an error correction code computed over the data encoded in the data block;

decoding, in the PHY interface, the data encoded by the data symbols and passing the decoded data, irrespective of the FEC symbols, to a buffer for output to a data link layer interface, which performs link-layer processing functions on data packets received over the communication link;

concurrently with passing the decoded data to the buffer, detecting errors in the data using the error correction code;

correcting the errors using the error correction code so as to generate corrected data; and upon detecting an error in a given data block in the series, passing the corrected data from the given data block from the PHY interface to the buffer for output to the data link layer interface in place of the data from the given data block that were previously decoded and passed to the buffer, wherein detecting the errors comprises checking each of the data blocks for the errors and to outputting a signal to the data link layer interface indicating whether each of the data blocks was error-free or erroneous, and the data link layer interface reads the data from the buffer or waits for correction depending upon the signal.

7. The method according to claim 6, wherein correcting the errors comprises computing a corrected data block within a predefined computation time, and wherein detecting the errors comprises checking for the errors and outputting the signal with respect to any particular data block in the series within a detection time that is less than half the predefined computation time.

8. The method according to claim 6, wherein detecting the errors comprises checking for the errors and outputting the signal with respect to any particular data block within a detection time that is no greater than a write time required for the data in the particular data block to be decoded and transferred to the buffer.

9. The method according to claim 6, and comprising applying the decoded data to a first input of a multiplexer, and applying the corrected data to a second input of the multiplexer, and select the first input for output to the buffer as long as the data blocks are error-free and, upon detection of an erroneous data block, selecting the second input so that the corrected data is output from the multiplexer to the buffer.

10. The method according to claim 9, wherein selecting the second input causes the corrected data to overwrite the data previously decoded from the given data block and passed by the input circuit to the buffer.

* * * * *